(12) United States Patent
Frissenbichler

(10) Patent No.: US 11,273,979 B2
(45) Date of Patent: Mar. 15, 2022

(54) SHELVING SYSTEM HAVING A SHUTTLE VEHICLE

(71) Applicant: FB Industry Automation GmbH, Albersdorf-Prebuch (AT)

(72) Inventor: Werner Frissenbichler, St. Kathrein am Offenegg (AT)

(73) Assignee: FB Industry Automation GmbH, Albersdorf-Prebuch (AT)

( * ) Notice: Subject to any disclaimer, the term of this patent is extended or adjusted under 35 U.S.C. 154(b) by 0 days.

(21) Appl. No.: 16/760,852

(22) PCT Filed: Oct. 30, 2018

(86) PCT No.: PCT/EP2018/079653
§ 371 (c)(1),
(2) Date: Apr. 30, 2020

(87) PCT Pub. No.: WO2019/086420
PCT Pub. Date: May 9, 2019

(65) Prior Publication Data
US 2021/0214160 A1 Jul. 15, 2021

(30) Foreign Application Priority Data
Oct. 30, 2017 (DE) .......................... 102017219432.4

(51) Int. Cl.
*B65G 1/04* (2006.01)
*B66F 9/07* (2006.01)
*B66F 9/14* (2006.01)

(52) U.S. Cl.
CPC .............. *B65G 1/0435* (2013.01); *B66F 9/07* (2013.01); *B66F 9/141* (2013.01)

(58) Field of Classification Search
CPC ..... B65G 1/0435; B65G 1/0492; B66F 9/141; B66F 9/07
See application file for complete search history.

(56) References Cited

U.S. PATENT DOCUMENTS 3,556,329 A * 1/1971 Johnston ............. C01B 21/1454
 414/663
4,459,078 A 7/1984 Chiantella et al.
(Continued)

FOREIGN PATENT DOCUMENTS

AT 511 140 A1 9/2012
CN 105705441 A 6/2016
(Continued)

OTHER PUBLICATIONS

International Search Report and Written Opinion for International Application No. PCT/EP2018/079653, dated Jan. 31, 2019.
(Continued)

*Primary Examiner* — Kaitlin S Joerger
(74) *Attorney, Agent, or Firm* — Wolf, Greenfield & Sacks, P.C.

(57) ABSTRACT

A shuttle vehicle is provided for transporting stored goods in a shelving system. The shuttle vehicle comprises a running gear having wheels mounted thereon to move the shuttle vehicle along guide rails of the shelving system. At least one telescopic guide rail is mounted on the running gear such that its direction of travel deviates from that of the guide rails of the shelving system by a predetermined angle greater than zero. The shuttle vehicle further comprises at least one telescopic system having telescope wheels mounted thereon to retract and extend the telescopic system in a plane along at least one telescopic guide rail relative to the running gear. A shelving system is provided which uses the shuttle vehicle.

14 Claims, 7 Drawing Sheets

(56) References Cited

U.S. PATENT DOCUMENTS

| | | | |
|---|---|---|---|
| 11,084,410 B1* | 8/2021 | Bhaskaran | G05D 1/0246 |
| 2002/0070099 A1 | 6/2002 | Neely | |
| 2014/0205423 A1* | 7/2014 | Yamashita | B65G 1/1378 |
| | | | 414/807 |
| 2014/0271069 A1* | 9/2014 | Salichs | B65G 1/065 |
| | | | 414/495 |
| 2014/0277689 A1 | 9/2014 | Salichs | |
| 2015/0081089 A1 | 3/2015 | Kapust et al. | |
| 2016/0060037 A1 | 3/2016 | Razumov | |
| 2018/0134488 A1* | 5/2018 | Grosse | B65G 1/0435 |
| 2018/0370726 A1* | 12/2018 | Grosse | B65G 1/1371 |
| 2018/0370729 A1* | 12/2018 | Ueda | B65G 1/0435 |
| 2019/0283966 A1* | 9/2019 | Mariusse | B65G 1/1375 |
| 2020/0339349 A1 | 10/2020 | Frissenbichler | |

FOREIGN PATENT DOCUMENTS

| | | | | |
|---|---|---|---|---|
| CN | 112249631 A * | 6/2021 | | B65G 35/00 |
| DE | 32 07 860 A1 | 9/1982 | | |
| DE | 91 03 498 U1 | 8/1991 | | |
| DE | 43 27 382 A1 | 2/1995 | | |
| DE | 10 2013 013 274 A1 | 2/2015 | | |
| DE | 10 2014 012 254 A1 | 2/2016 | | |
| DE | 102015202141 A1 * | 8/2016 | | B66F 9/07 |
| DE | 202016107020 U1 * | 1/2017 | | B65G 1/065 |
| DE | 10 2016 105 677 A1 | 10/2017 | | |
| EP | 3395724 A1 * | 10/2018 | | A62C 35/10 |
| KR | 20170026074 A * | 3/2017 | | B65G 1/0421 |
| KR | 20180047169 A * | 5/2018 | | B65G 1/0407 |
| WO | WO 2014/009797 A1 | 1/2014 | | |
| WO | WO 2015/038999 A2 | 3/2015 | | |

OTHER PUBLICATIONS

International Preliminary Report on Patentability for International Application No. PCT/EP2018/079653, dated May 14, 2020.

International Search Report and Written Opinion for International Application No. PCT/EP2018/079643, dated Jan. 31, 2019.

International Preliminary Report on Patentability for International Application No. PCT/EP2018/079643, dated May 14, 2020.

* cited by examiner

SHELVING SYSTEM HAVING A SHUTTLE VEHICLE

CROSS-REFERENCE TO RELATED APPLICATIONS

This Application is a national stage filing under 35 U.S.C. 371 of International Application Serial No. PCT/EP2018/079653, filed Oct. 30, 2018, which claims priority to German application no. 10 2017 219 432.4, filed Oct. 30, 2017, each of which is herein incorporated by reference in their entirety.

The present invention relates to a shelving system having a shuttle vehicle, and in particular a shelving system having a shuttle vehicle, in which a telescopic underfeeding technique is used for storing and retrieving heavy loads.

In existing storage systems, ground conveying vehicles and storage and retrieval devices provide the basis for loading and retrieving articles from storage spaces of a storage system.

However, such ground conveying vehicles and storage and retrieval devices regularly require a lot of space and are restricted with regard to the storage depth.

In addition, such ground conveying vehicles regularly require additional space for maneuvering, so that their use leads to a reduction of the capacities available for storage.

Accordingly, the technical problem of the present invention is to increase the flexibility and efficiency of a storage system.

According to the present invention, this technical problem is solved with a shuttle vehicle according to patent claim 1.

The shuttle vehicle according to the invention can be moved in the shelving system for transporting stored goods. The shuttle vehicle comprises a running gear having wheels mounted thereon in order to move the shuttle vehicle along guide rails of the shelving system. The shuttle vehicle further comprises at least one telescopic guide rail which is mounted on the running gear such that its direction of travel deviates from that of the guide rails of the shelving system by a predetermined angle greater than zero, for example an angle of essentially 90°.

Furthermore, the shuttle vehicle comprises a telescopic system for each telescopic guide rail, which has telescope wheels mounted thereon in order to retract and extend the telescopic system along the corresponding telescopic guide rail relative to the running gear in a plane.

Moreover, the technical problem of the present invention is solved by a shelving system according to patent claim 12.

The shelving system comprises at least one storage plane, in which a plurality of storage spaces, operating spaces or shelf spaces is arranged at right angles. The shelving system further comprises at least one shuttle passage per storage plane running between opposite outer sides of the shelving system. The shuttle passage runs straight along storage spaces of the storage plane. In addition, the shelving system comprises at least one shuttle vehicle according to the invention, which can be moved in at least one shuttle passage of the storage system for storing and retrieving stored goods.

Further advantageous embodiments of the present invention are indicated in the dependent patent claims.

Preferred embodiments of the present invention are described below with reference to the drawings.

Figure 1:
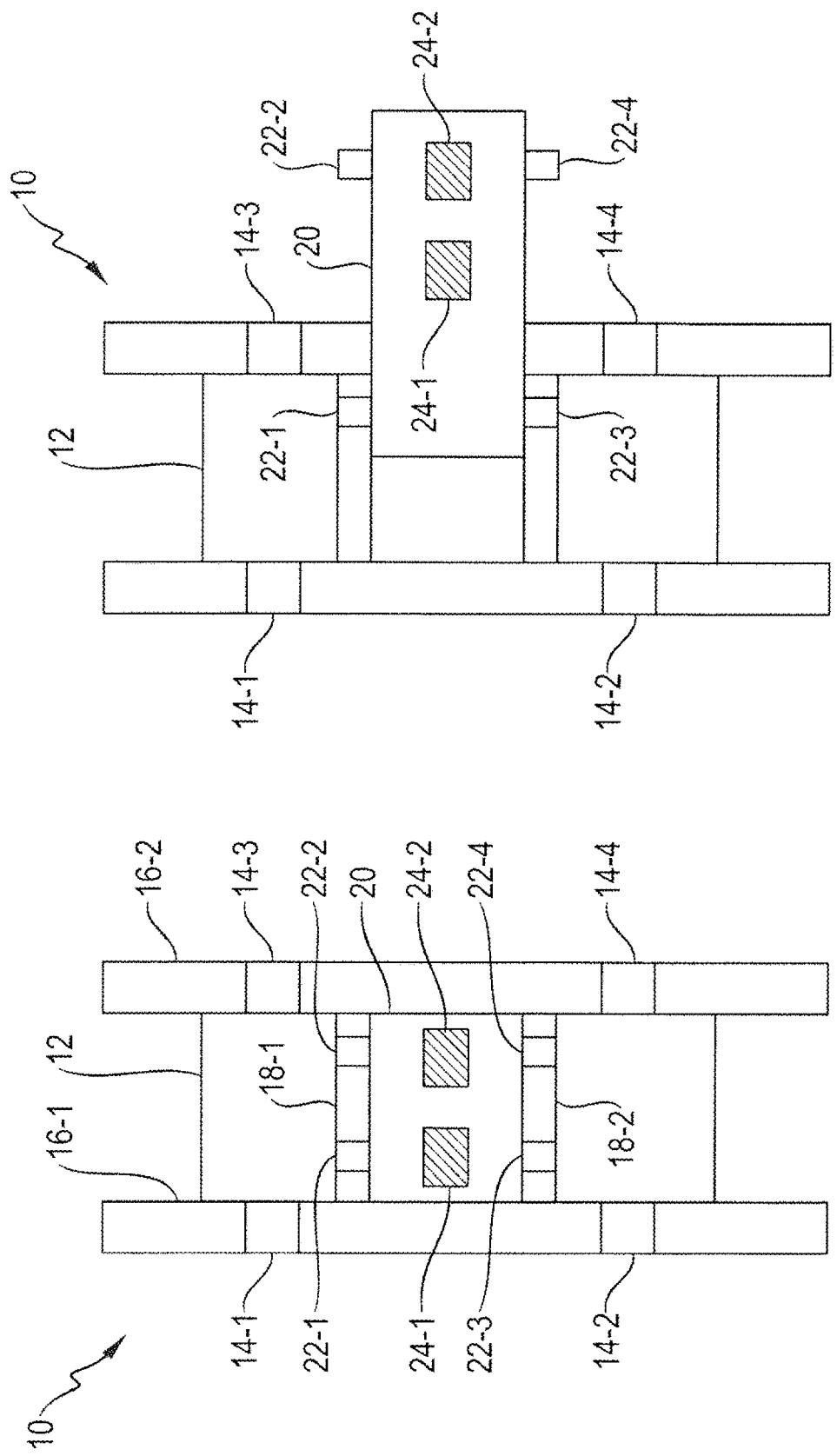
FIG. 1 shows a top view of the shuttle vehicle according to the invention with a retracted or extended telescopic system.

FIG. 1 shows a top view of a shuttle system 10 according to the invention with a retracted telescopic system 12, FIG. 1(A), and with an extended telescopic system 12, FIG. 1(B).

As shown in FIG. 1, the shuttle vehicle 10 serves to transport stored goods in a shelving system. It comprises a running gear 12 having wheels 14-1, 14-2, 14-3, 14-4 mounted thereon in order to move the shuttle vehicle along guide rails 16-1, 16-2 of the shelving system.

As shown in FIG. 1(A) and in FIG. 1(B), the shuttle vehicle 10 comprises at least one telescopic guide rail 18-1, 18-2 which is mounted on the running gear 12 such that its direction of travel deviates from that of the guide rail 16-1, 16-2 of the shelving system by a predetermined angle greater than zero. For example, this angle has a value of essentially 90°, so that the directions of travel of the guide rails 16-1, 16-2 extend to the two sides of the shuttle vehicle 10. According to the present invention, it is also possible, however, to select a smaller or greater value for the angle in order to realize an oblique extending direction with respect to the guide rails of the shelving system.

As shown in FIG. 1(A) and FIG. 1(B), the shuttle vehicle 10 further comprises a telescopic system 20 having telescope wheels 22-1, 22-2, 22-3, 22-4 mounted thereon in order to retract and extend the telescopic system 20 along the corresponding telescopic guide rail or the corresponding guide rails 18-1, 18-2 relative to the running gear 12 in a plane.

According to the present invention, the telescopic system 20 is constructed in a single-acting manner. This means that the telescopic arm is formed as a one-part element and can thus be moved in a plane. This leads to a generally very low construction for the shuttle vehicle, which is of particular significance for increasing the efficiency in the shelving system.

Moreover, within the scope of the present invention, the shuttle vehicle 10 is configured as a heavy-load shuttle vehicle.

In the heavy-load variant, the extending and retracting telescopic system 20 runs on allocated guide rails which are provided in the storage system for accommodating the forces acting due to the load of the telescopic system 20.

To move the telescopic system 20, an allocated drive can be provided at the shuttle vehicle 10, for example a chain drive. Alternatively, the telescopic system can be provided with a drive of its own, for example an electric motor, by which the flexibility increases since there are no restrictions with regard to the insertion depth into the shelving system.

With the combination of the running gear 12 and the telescopic system 20, it is possible, according to the invention, to perform a multi-depth storage in any variability.

In this respect, a multi-depth storage can be performed, depending on the partition with respect to the depth of the shelf. This results in a one-depth storage if the length which can be operatively served by the telescopic system is equal to the storage depth. Accordingly, this results in a two-depth storage if the length which can be operatively served by the telescopic system is equal to the two-depth storage depth, etc.

As shown in FIGS. 1(A) and 1(B), two stored goods 24-1, 24-2 can be used, for example, for a two-depth storage. Here, shuttle vehicles load the storage system by means of the telescopic system 20 or remove storage containers by means of the telescopic system 20.

In the heavy-load variant, the telescopic system 20 stores and retrieves the stored goods by means of the telescopic underfeeding technique.

In the heavy-load variant, the wheels 22-1, 22-2, 22-3, 22-4 of the telescopic system 20 run in guide rails of the shelving system in order to be able to accommodate a large load.

In the heavy-load variant, the vehicle shuttle 10 can have a weight of approximately 15 t and store goods up to 6 m deep. Narrow and broad products such as chipboard stacks etc. can be stored several meters deep. In the case of one-depth technique e.g. with a length of up to 5.7 m and a width of 2.1 m and a height of 0.9 m with a weight of approximately 15 t; in the case of two-depth storage e.g. with a length of 2.8 m and a width of 2.1 m and a height of 0.9 m each with a weight of approximately 4.5 t to 7.5 t; and in the case of four-depth storage e.g. two-depth deep side by side with a length of 2.8 m and a width of 1.1 m. In the latter case, two packages can be stored side by side and two packages can be stored one behind the other; thus, there is space for four pieces of stored goods per storage box.

Moreover, in accordance with the shuttle technology according to the invention, dynamic shelf storage and commissioning applications can be used, depending on the industry, for heavy products up to 15 t, with a telescope 20 being used for underfeeding, lifting and retrieving or storing. Shorter packages can be stored one behind the other. Access is variable with regard to the depth, so that the required depth is stored and retrieved. For example, if only the third package out of three packages is required, the packages 1 and 2 can be stored again on the opposite side.

Furthermore, in the shuttle technology according to the invention, the efficiency is higher than in conventional storage and retrieval vehicles due to a plurality of shuttle vehicles since a higher efficiency is possible by means of parallel operation. As described in more detail below, several shuttle vehicles can be used per level of a shelving system, which can be transferred vertically between individual levels of the shelving system by means of a shuttle conveyor. The conveyors can be arranged on one or two sides of the shelving system. With the conveyors, the shuttle vehicles are transferred with or without additional load. Alternatively, only products can be transferred as well; then a conveyor for shuttles on a front side of the shelving system and a conveyor only for products on the other side or along the shelf would be a realization possibility.

Figure 2:
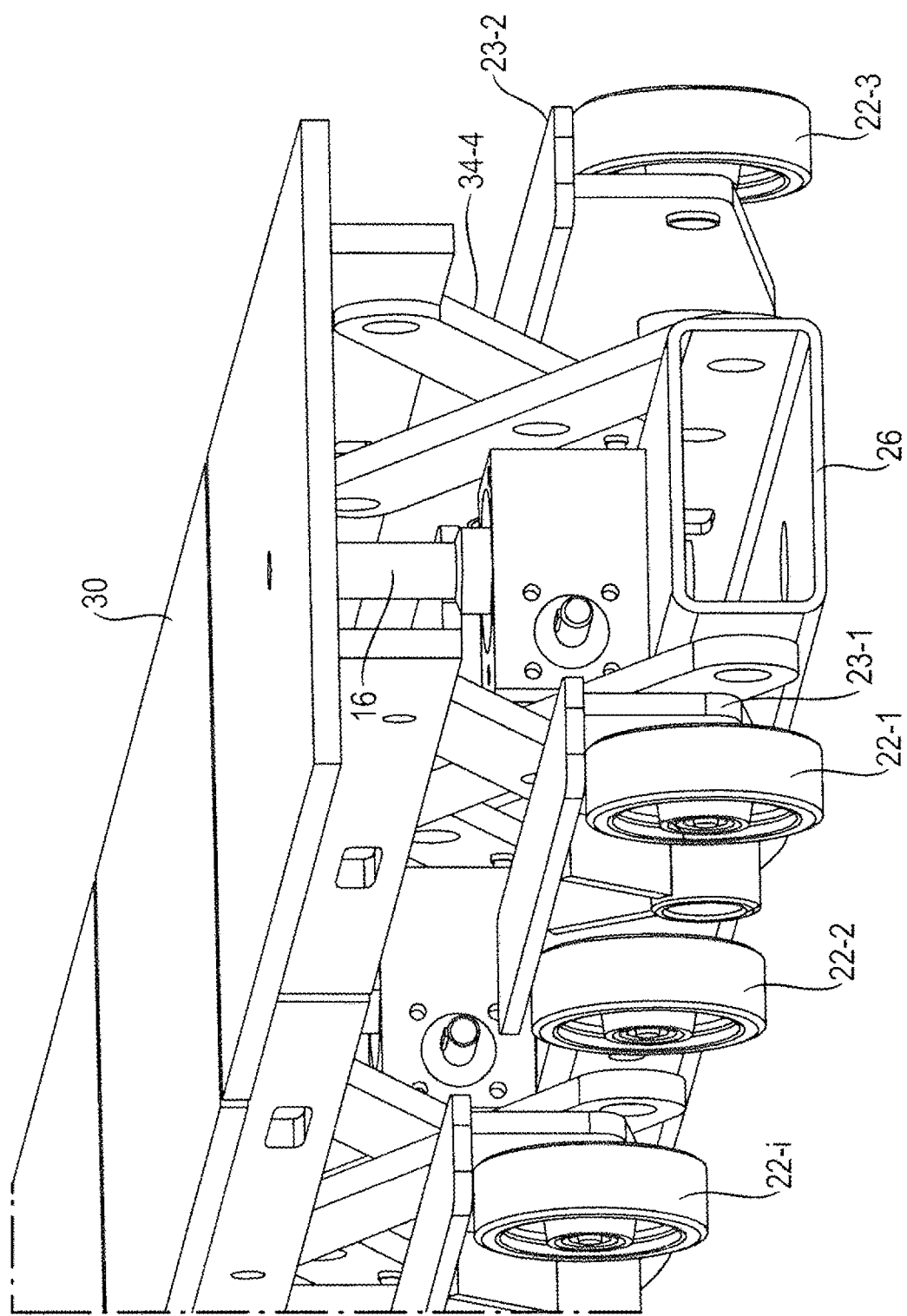
FIG. 2 shows a perspective view of the telescopic system according to the invention.

FIG. 2 shows a perspective view of the telescopic system 20 according to the invention.

As shown in FIG. 2, the telescopic system 20 comprises a base carrier element 26 on which the wheels 22-1, 22-2, . . . are mounted by means of wheel suspensions 28-1, 28-2, . . . . Moreover, the telescopic system 20 comprises a loading area 30 mounted on the base carrier element 26. Preferably, the wheel suspensions 28-1, 28-2, . . . are configured such that the wheels 22-1, 22-2, . . . can be tilted along the direction of movement of the telescopic system 20.

As shown in FIG. 2, the telescopic system 20 further comprises a lifting system, by means of which the loading area 30 is mounted on the base carrier system 26 in a height-adjustable manner. The lifting system is formed by several cross struts mounted on the base carrier element 26 and on the loading area 30 and in addition several lifting columns 36 for positioning the loading area 30 relative to the base carrier element 26. The mode of operation of the lifting system can be configured mechanically, electrically and/or hydraulically.

In addition, the configuration of the lifting system is not restricted to a cross strut. Linear lifting elements, eccentric lifting elements or crank drives are also options.

Figure 3:
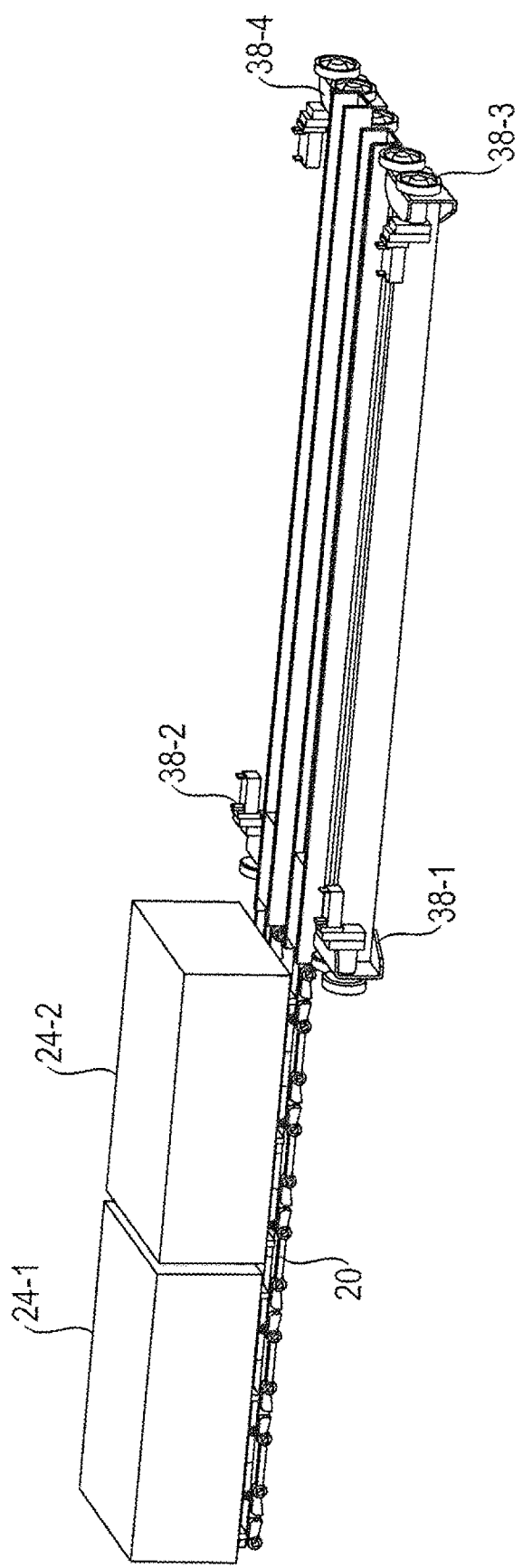
FIG. 3 shows a perspective view of the shuttle vehicle according to the invention with an extended telescopic system in the case of multi-depth storage of transport containers.

FIG. 3 shows a perspective view of the shuttle vehicle 10 according to the invention with a two-depth storage when the telescopic system 20 is extended.

As shown in FIG. 3, stored goods can be carried in load carriers 24-1, 24-2 with a predetermined length, height and width. In this respect, the loading area 30 of the telescopic system 20 has, in the case of one-depth storage, a length which is a multiple of the length or width of the load carriers, in particular once the length or width of the load carriers 24-1, 24-2.

As shown in FIG. 3, in the heavy-load variant, the telescope wheels 22-1, 22-2, . . . of the telescopic system 20 can rest in corresponding telescopic guide rails of the storage system.

According to the invention, storage and retrieval are performed by means of the telescopic system 20 of a shuttle vehicle 10 in a raised state. After that, containers 24-1, 24-2 are lowered on an operating space of the shelving system, and after lowering, the telescopic system 20 is retracted again.

As shown in FIG. 3, the shuttle vehicle 10 is provided with a single-acting telescopic system 20 which can be extended on the right or left. In this respect, single-acting means extending in one plane in order to achieve a minimum construction height. Moreover, the shuttle vehicle 10 according to the invention comprises drive motors 38-1, 38-2, 38-3, 38-4 allocated to the wheels 40-1, 40-2, 40-3, 40-4 of the running gear 12. Furthermore, a drive motor for the lifting drive in the case of an electric configuration of the lifting system and a drive motor for the telescopic system 20 are provided.

Alternatively, the conveyor technique could consist of several conveyor belts, for example four conveyor belts, depending on the stored goods and weight with chain, toothed belt etc.

Moreover, the shuttle vehicle 10 can be equipped with a double belt conveyor technique, for which a drive motor is then provided as well. Preferably, it is provided that two conveyor belts of the double belt conveyor technique are provided along each longitudinal side of the loading area 30 of at least one telescopic system 20. More preferably, the running surfaces of the double belt conveyor technique are also spaced apart relative to the surface of the loading area 30 of the telescopic system 20 in accordance with a predetermined distance greater than zero. This distance can have a value of 5 mm to 5 cm, for example.

For the conveyor technique, a further option is the use of chain conveyors, toothed belts or conveyor belts.

As shown in FIG. 3, any number of stored goods can be stored in a single-acting manner in an angular shelf by means of the combination of a telescopic system 20 with a lifting drive with a small construction height, with a limitation being given only by the length of the telescopic system 20.

The shuttle vehicle 10 of the present invention further comprises a controller. Preferably, the controller is supplied by means of an interface for wireless communication, e.g. WLAN, with data relevant for the movement process and the loading process, which are provided by an external control system of the shelving system.

For the energy supply of the electrical consumers of the shuttle vehicle 10, an energy storage can be provided in combination with a capacitor intermediate storage technique, for example. Alternatively, energy can be supplied by means of a conductor rail along a travel passage of the shuttle vehicle 10.

According to the present invention, the shuttle vehicle 10 can comprise a variable number of telescopic systems 20 which can be operated independently of each other.

Figure 4:
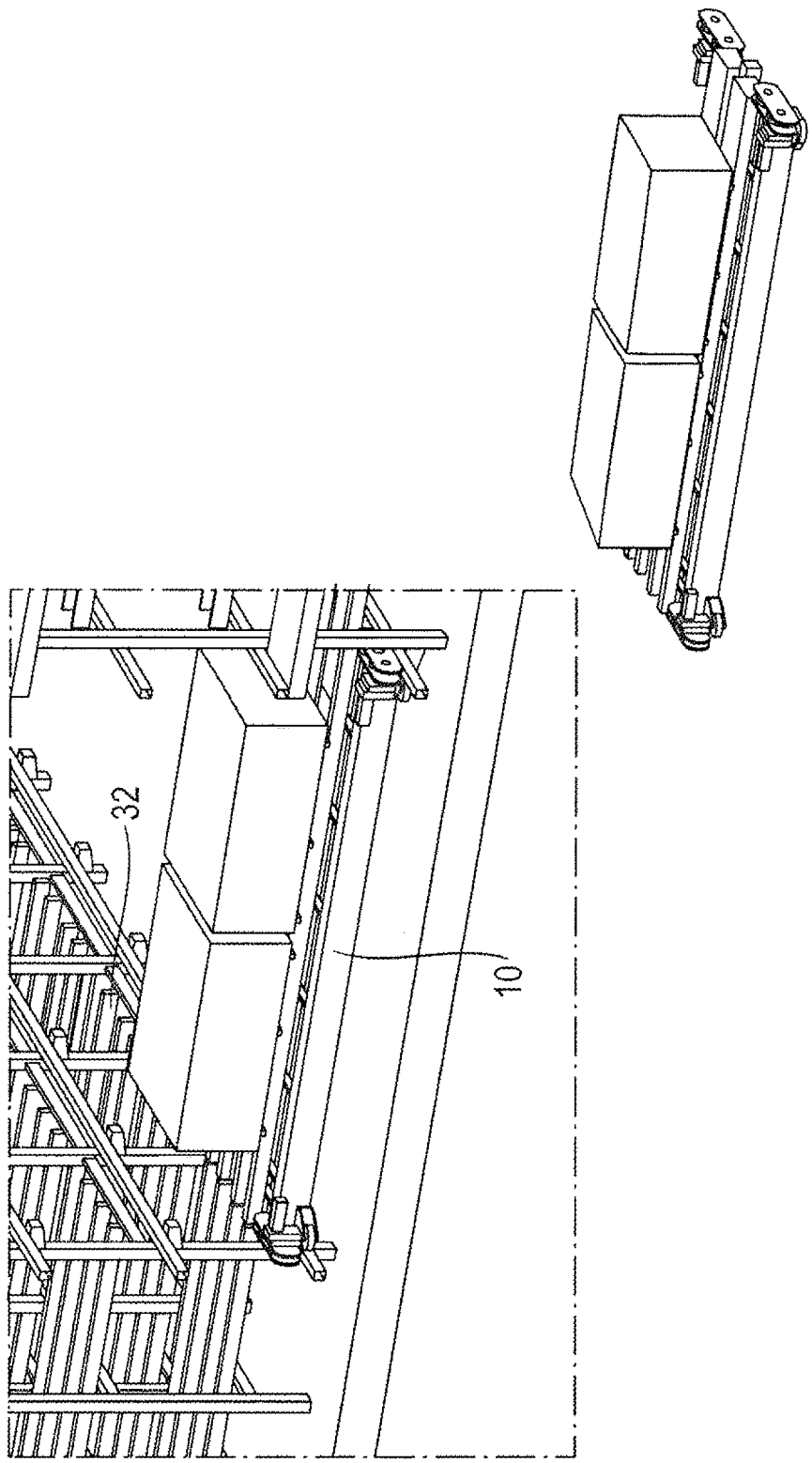
FIG. 4 shows the use of the shuttle vehicle according to the invention in a storage system according to the invention.

FIG. 4 shows the use of the shuttle vehicle according to the invention in a storage system according to the invention.

More clearly, FIG. 4 shows the positioning of the shuttle system 10 according to the invention relative to a storage box 32 of the shelving system.

As shown in FIG. 4, the shuttle vehicle 10 approaches the storage box 32 such that the guide rails 18-1, 18-2 of the shuttle vehicle 10 are oriented alternatingly with the allocated guide rails of the storage box 32. As soon as this orientation is achieved, the shuttle vehicle 10 stops and the telescopic system 20 can drive into the storage box 32. In this respect, a multi-depth storage, in FIG. 4 a two-depth storage, is limited only by the length of the telescopic system 20. Moreover, the heavy-load variant can be realized within the scope of the present invention since the load and the forces resulting therefrom can be introduced directly into the storage system via the rails of the storage box 32, without additional forces acting on the shuttle vehicle 10.

Figure 5:
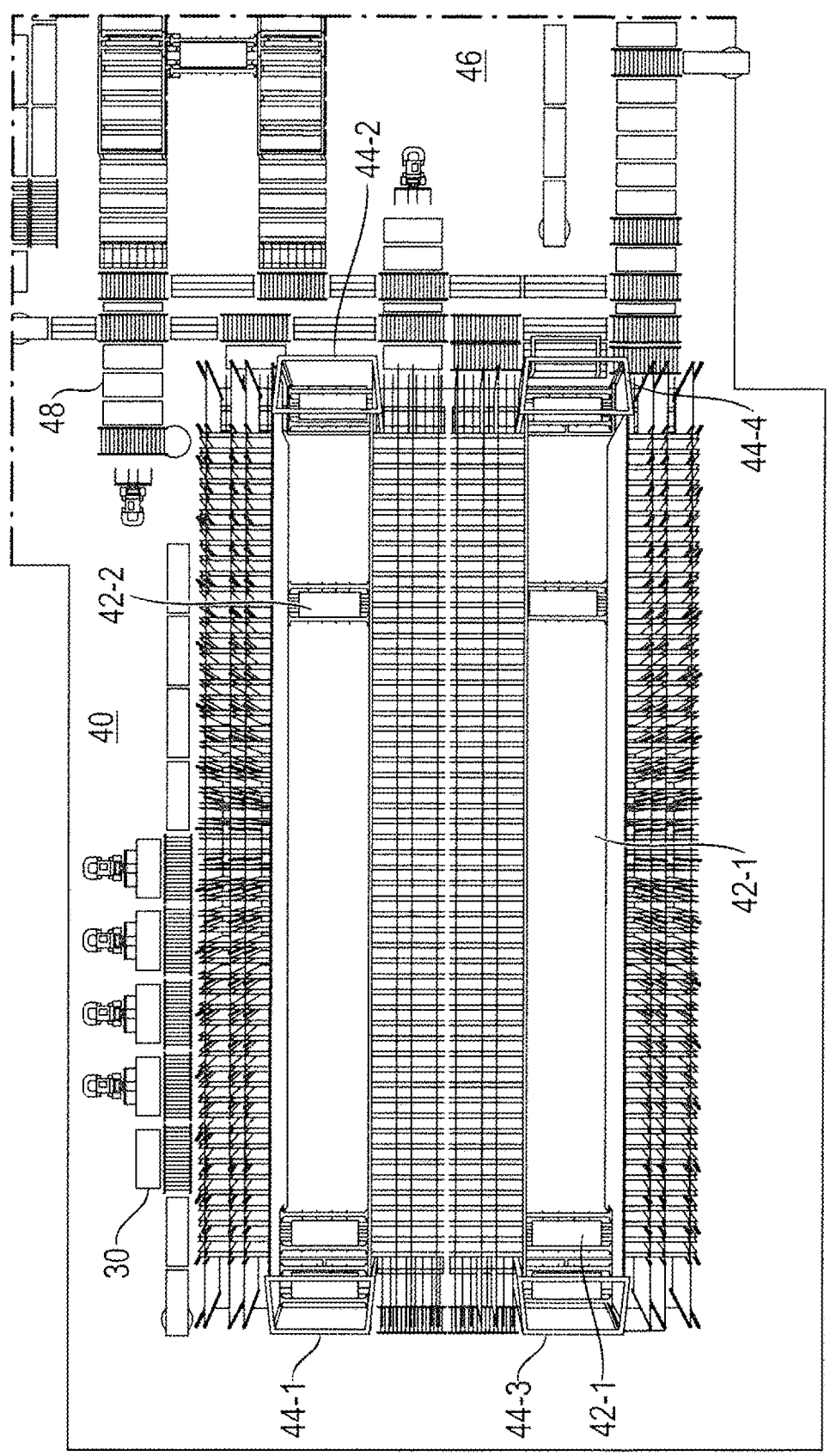
FIG. 5 shows a top view of a storage system according to the invention.

FIG. 5 shows a top view of a shelving system according to the invention, which is operated together with at least one shuttle vehicle 10 according to the present invention.

As shown in FIG. 5, the shelving system 40 comprises at least one storage plane, in which a plurality of storage boxes is arranged at right angles.

As shown in FIG. 5, the shelving system 40 comprises at least one shuttle passage 42-1, 42-2 per storage plane running straight between opposite outer sides of the shelving system 40, which extend along the storage boxes of each storage plane.

Moreover, the shelving system 40 according to the present invention comprises at least one shuttle vehicle 10, as described in accordance with FIG. 1 to FIG. 3. The shuttle vehicle 10 can be moved in the at least one shuttle passage 42-1, 42-2 of the storage system 40 in order to store and retrieve stored goods by means of the telescope technique according to the invention.

Moreover, according to the invention, the storage boxes are provided with telescopic guide rails on their bottom, so that in the heavy-load case telescope wheels 22-1, 22-2, 22-3, 22-4 rest on these telescopic guide rails when the telescopic system 20 of the shuttle vehicle 10 is extended. In addition, conductor rails can be provided in each shuttle passage in order to supply the shuttle vehicle 10 with energy.

As shown in FIG. 5, at least one conveyor or lift system 44-1, 44-2, 44-3, 44-4 is provided on the outer sides of the shelving system 40 in order to transfer a shuttle vehicle 10 and/or stored goods between different storage levels in height direction with respect to the individual storage planes of the shelving system 40.

As shown in FIG. 5, a conveyor system 44-1, 44-2, 44-3, 44-4 operatively serves a front zone 46 of the shelving system 40. In this respect, a supplying and a discharging conveyor technique 48 is arranged opposite the lift system. Supplying and discharging can be performed in several planes, and thus several supplies and discharges can be carried out on one side, on opposite sides or on several sides.

As shown in FIG. 5, conveyor shelves 50 can be arranged along the shelving system 40, which can be filled on their upper side by means of a shuttle vehicle 10 and on the bottom of which stored goods can be retrieved by a shuttle vehicle 10.

Figure 6:
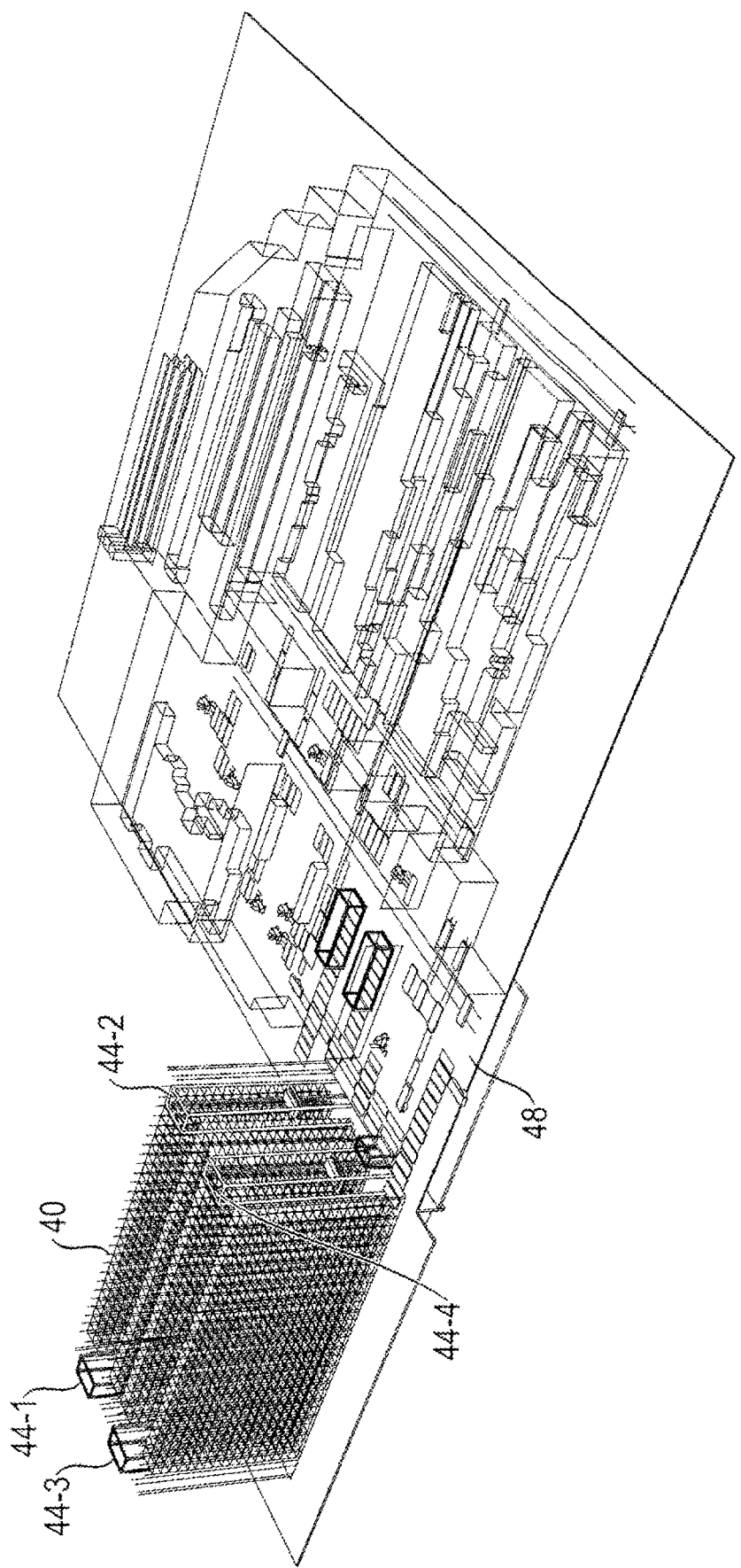
FIG. 6 shows a perspective view of the storage system according to the invention.

FIG. 6 shows a perspective view of the shelving system according to the invention.

As shown in FIG. 6, conveyor systems 44-1, 44-2, 44-3, 44-4 are each provided at the end of a shuttle passage. With the conveyor systems 44-1, 44-2, 44-3, 44-4, shuttle vehicles 10 can be carried between planes of the shelving system 40 or to the front zone 46. According to the invention, a combination of product conveyor and shuttle conveyor can also be used. Since conveyor belts can be loaded along the longitudinal side of the shelving system 40, an advantage is achieved to the effect that a possibility of a combination with standardized goods to person commissioning spaces is also possible.

Moreover, according to the invention, shuttle vehicles 10 including stored goods can be transferred by the conveyor systems 44-1, 44-2, 44-3, 44-4. Several shuttle vehicles 10 per plane of the shelving system 40 can be used. A combination of product and shuttle vehicle transfer is also possible.

With regard to the shelving system 40 shown in FIG. 6, a standardized procedure as follows results:

The shuttle conveyor or the lift system brings the shuttle vehicle 10 into the front zone 46. There, the shuttle vehicle 10 accommodates the product to be stored. The lift system 44-2, 44-4 brings the shuttle vehicle 10 with the product into the logistically correct plane, where the shuttle vehicle 10 drives into the plane and subsequently stores the product to be stored in the storage box provided therefor. This procedure can be applied in reverse order during retrieval.

By providing several lift systems, a route-optimized and likewise redundant procedure can be ensured.

As shown in FIG. 6, a further advantage of the present invention lies in the combination of the storage function with the commissioning function directly on the basis of the shelving system 40 and/or a separate arrangement at the shelving system 40. Thus, increasing requirements in the environment of Industry 4.0 system solutions are fulfilled, with regard to storing, buffering, commissioning and for an optimum solution of the superordinate communication by means of WLAN. The shuttle technology according to the invention is characterized by a lower energy consumption and a solution that is very gentle on the product.

Optionally, configurations of the shuttle vehicle 10 with and without a chain conveyor are also possible, by means of which stored goods can be transported onto the loading area.

In the area of the front zone 46, the shuttle vehicle 10, after being carried by the lift into the correct height position, can deliver the stored goods on one side to the conveyor technique 48 and pick up the stored goods on the other side from the conveyor technique 48. In this respect, the delivery and the pick-up are performed by means of the telescope technique or, if necessary, also by means of a chain conveyor arranged at the shuttle vehicle 10. Conveyor technique connections can be configured in multiple layers or on one side. Connections on both front sides of the shelf or along the shelving system 40 at the position of an operating space for the transfer to a shuttle vehicle 10 are also possible.

According to the invention, if very high efficiency is required, one lift system or several lift systems can be provided on one side of the shelving system 40 for transferring stored goods. In this case, shuttle vehicles 10 transport in the respective planes only the stored goods to the defined transfer station, preferably at the end of the shuttle passages 42-1, 42-2.

From there, the containers, products etc. are then brought into the front zone 46 with the supplying and discharging conveyor technique 48 by means of lift systems configured as conveyors for stored goods.

A transfer of the shuttle vehicles 10 from one shuttle passage to another shuttle passage in the horizontal direction is also possible within the scope of the present invention, both in the heavy-load variant and in the small-load variant.

Figure 7:
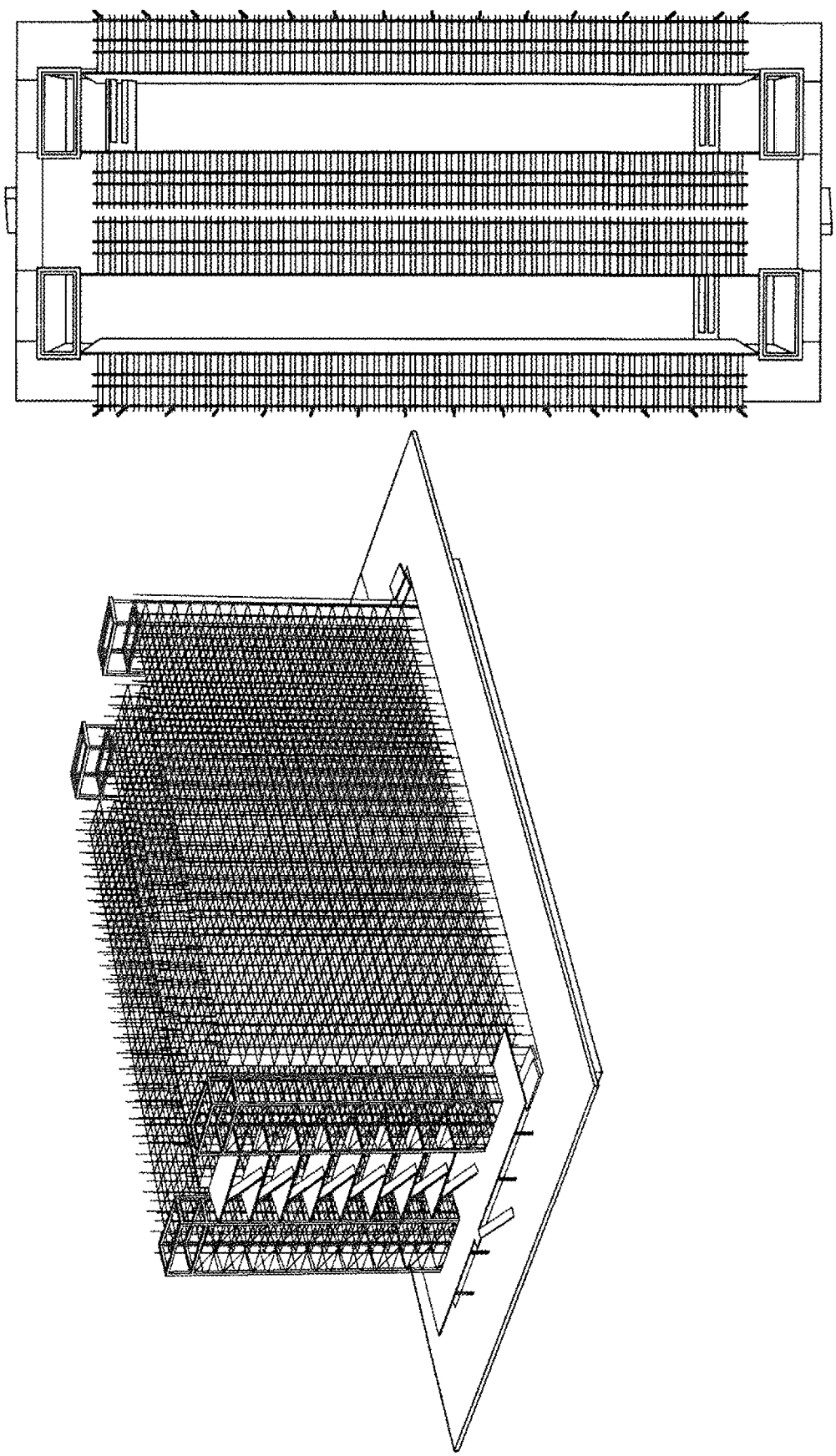
FIG. 7 shows a perspective view of the storage system according to the invention with commissioning conveyor shelves.

FIG. 7 shows a perspective view of the storage system according to the invention with commissioning conveyor shelves.

As shown in FIG. 7, according to the invention, one or several commissioning conveyor shelves can be combined with the shelving system 40. This leads to a particularly advantageous storage and material handling control of the entire system. Moreover, depending on the efficiency requirements, the number of the shuttle vehicles 10 used within the scope of the shelving system can be determined variably.

If commissioning conveyor shelves or conveyor shelves are arranged along the shelving system 40 for commissioning or for delivering and dispatching stored goods, these are filled on the upper side, i.e. the side of the moving path, by the shuttle vehicle 10. On the bottom, products can be removed from the containers or bundles or directly. Empty load carriers can be brought back via a conveyor shelf route descending with respect to the shuttle passage. On the bottom end, the stored goods are retrieved in this case in turn by the shuttle vehicle 10 by means of the telescopic underfeeding technique. Thus, stored goods can also be transported from one shelving system to another shelving system, optionally also by means of a driven conveyor technique. If the interface to the shuttle vehicle 10 is configured by means of a driven conveyor technique, a double belt conveyor technique can be used at the shuttle vehicle 10 for retrieval.

For commissioning, the conveyor shelves are provided with display systems such as "pick-by-light" or "pick-by-voice", for example. In addition, fully automatic commissioning by means of robotics is also possible.

All in all, the present invention allows the use of a very low, single-acting underfeeding telescope which in combination with a shelving system 40 allows multi-depth storages. Consequently, a conveyor shelf can be operated actively by means of a telescopic system 20 during filling and removal. As a result, the present invention achieves a multi-depth storage by the telescopic system 20 which can be raised and lowered via a lifting system at the shuttle vehicle 10.

The invention claimed is:

1. A shuttle vehicle for transporting stored goods in a shelving system, the shuttle vehicle comprising:
    a running gear having wheels mounted thereon to move the shuttle vehicle along guide rails of the shelving system;
    at least one telescopic guide rail mounted on the running gear-such that its direction of travel deviates from that of the guide rails of the shelving system by a predetermined angle greater than zero; and
    at least one telescopic system having telescope wheels mounted thereon to retract and extend the telescopic system in a plane along the at least one telescopic guide rail relative to the running gear, the at least one telescopic system comprising a lifting system configured to mount the loading area on the base carrier system in a height-adjustable manner, wherein the lifting system comprises a plurality of shear cross struts mounted on the base carrier element and on the loading area and a plurality of lifting columns configured to position the loading area relative to the base carrier element.

2. The shuttle vehicle according to claim 1, wherein the at least one telescopic system comprises:
    a base carrier element on which the telescope wheels are mounted by use of wheel suspensions; and
    a loading area mounted on the base carrier element.

3. The shuttle vehicle according to claim 1, wherein the lifting system is a mechanical, an electric and/or a hydraulic lifting system.

4. The shuttle vehicle according to claim 1, wherein stored goods can be carried in load carriers of a predetermined length, height, the telescopic system including a loading area having a length which is an integer multiple of the length and/or width of the load carriers.

5. The shuttle vehicle according to claim 1, further comprising at least one drive for the shuttle vehicle and at least one drive for the lifting system.

6. The shuttle vehicle according to claim 1, further comprising at least one drive motor to extend the telescopic system, the drive motor being mounted on the shuttle vehicle or the telescopic system.

7. The shuttle vehicle according to claim 1, further comprising a controller having an interface configured for wireless communication in order to perform data communication with an external control system.

8. The shuttle vehicle according to claim 1, further comprising an energy storage or a sliding contact.

9. The shuttle vehicle according to claim 2, further comprising conveyor belts of a double belt conveyor technique provided along each longitudinal side of the loading area of the at least one telescopic system, the conveyor belts including running surfaces spaced apart relative to the surface of the loading area of the telescopic system in accordance with a predetermined distance greater than zero.

10. A shelving system, comprising:
    at least one storage plane, in which a plurality of storage spaces is arranged at right angles;
    at least one shuttle passage per storage plane running straight between opposite outer sides of the shelving system, which runs along storage spaces of the storage plane;
    a shuttle vehicle according to claim 1, the shuttle vehicle being movable in the at least one shuttle passage of the storage system for storing and retrieving stored goods; and
    bottom-side telescopic guide rails for at least one storage space such that the telescope wheels of the telescopic system rest on the telescopic guide rails when the telescopic system of the shuttle vehicle is extended.

11. The shelving system according to claim 10, further comprising conductor rails along the at least one shuttle passage in order to supply the shuttle vehicle with energy.

12. The shelving system according to claim 10, further comprising at least one conveyor system on an outer side of the shelving system, the conveyor system configured to transfer a shuttle vehicle and/or stored goods between different storage levels in a height direction.

13. The shelving system according to claim 12, further comprising a lift system configured to operatively serve a front zone of the shelving system, where the front zone has a supplying and a discharging conveyor technique arranged opposite the conveyor system.

14. The shelving system according to claim 10, wherein a plurality of conveyor shelves are arranged along the shelving system, the conveyor shelves being fillable on an upper side thereof using the shuttle vehicle and on the bottom of which stored goods can be retrieved by the shuttle vehicle.

* * * * *